(12) United States Patent
Nagasawa

(10) Patent No.: US 11,124,102 B2
(45) Date of Patent: Sep. 21, 2021

(54) VEHICLE SEAT

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 26 days.

(21) Appl. No.: 16/752,834

(22) Filed: Jan. 27, 2020

(65) Prior Publication Data

US 2020/0307432 A1 Oct. 1, 2020

(30) Foreign Application Priority Data

Mar. 29, 2019 (JP) .............................. JP2019-066913

(51) Int. Cl.
*B60N 2/90* (2018.01)
*B60N 2/427* (2006.01)
*B60N 2/52* (2006.01)
*B60N 2/70* (2006.01)

(52) U.S. Cl.
CPC .......... *B60N 2/914* (2018.02); *B60N 2/42718* (2013.01); *B60N 2/52* (2013.01); *B60N 2/522* (2013.01); *B60N 2/525* (2013.01); *B60N 2/527* (2013.01); *B60N 2/7082* (2013.01)

(58) Field of Classification Search
CPC ...... B60N 2/7082; B60N 2/7084; B60N 2/52; B60N 2/522; B60N 2/525; B60N 2/527; B60N 2/914; B60N 2/42718
See application file for complete search history.

(56) References Cited

U.S. PATENT DOCUMENTS

| | | | | |
|---|---|---|---|---|
| 10,486,562 | B2 * | 11/2019 | Sharif | B60R 21/207 |
| 2010/0231016 | A1 * | 9/2010 | Volz | B60N 2/0244 |
| | | | | 297/217.1 |
| 2020/0238874 | A1 * | 7/2020 | Mazzucchelli | B60N 2/665 |
| 2020/0307433 | A1 * | 10/2020 | Nagasawa | B60N 2/42718 |

FOREIGN PATENT DOCUMENTS

| | | |
|---|---|---|
| JP | H4-115448 U | 10/1992 |
| JP | H10-229930 A | 9/1998 |

\* cited by examiner

*Primary Examiner* — Syed A Islam
(74) *Attorney, Agent, or Firm* — Smith, Gambrell & Russell, LLP

(57) ABSTRACT

A vehicle seat includes a seat cushion and a seat back. The seat cushion includes a storage member configured to store fine particles, shaped into a bag, and made of a flexible and gas-impermeable material, and a gas supply/suction member. The gas supply/suction member fluidizes the fine particles stored in the storage member by supplying the gas to the storage member to make it easy to change a shape of the storage member. The gas supply/suction member solidifies the fine particles stored in the storage member by sucking the gas from the storage member to make it hard to change the shape of the storage member. The storage member includes a rigid inclined member disposed on at least one end of a periphery of the storage member and configured to be inclined downward from an outer periphery of the seat cushion toward a center of the seat cushion.

8 Claims, 6 Drawing Sheets

VEHICLE SEAT

CROSS-REFERENCE TO RELATED APPLICATIONS

The present application claims priority from Japanese Patent Application No. 2019-066913 filed on Mar. 29, 2019, the entire contents of which are hereby incorporated by reference.

BACKGROUND

The disclosure relates to a vehicle seat equipped in a vehicle.

Known vehicle seats have been produced with taking into account a sitting posture recommended by makers, but without taking into account the sitting postures of individual occupants. If an occupant sits in a posture which is not recommended by the maker, the occupant fatigues in the body parts. In addition, this sort of vehicle seats is not produced taking into account the body type of the occupant.

To solve this problem, there has been known a vehicle seat including bags made of a flexible and air-impermeable material, filled with fine particles flowing in the bags, and disposed on a seat and a seat back, which is disclosed, for example, in Japanese Unexamined Patent Application Publication (JP-A) No. H10-229930. In the vehicle seat disclosed in JP-A No. H10-229930, the fine particles in the bags are flowed by using the weight of the occupant sitting on the seat to form the concave-convex surfaces of the seat and the seat back which conform to the sitting posture of the occupant, and the concave-convex surfaces of the seat and the seat back are maintained by sucking the air from the bags to fix the positions of the fine particles in the bags.

Meanwhile, there has been known a vehicle seat including a plurality of airtight bags filled with foam plastic particles as fine particles in the space between a surface skin member and a cushion body, which is disclosed, for example, in Japanese Unexamined Utility Model (Registration) Application Publication (JP-UM-A) No. H4-115448. In the vehicle seat disclosed in JP-UM-A No. H4-115448, the entire surface of the surface skin member is formed as a concave-convex surface conforming to the sitting posture of the occupant, and the concave-convex surface is maintained by reducing the pressure in the plurality of airtight bags so that the foam plastic particles tightly adhere to each other and are solidified.

SUMMARY

An aspect of the disclosure provides a vehicle seat including a seat cushion and a seat back. The seat cushion configured to support a hip of a occupant. The seat cushion includes a storage member made and a gas supply/suction member. The storage member is made of a flexible and gas-impermeable material, shaped into a bag, and configured to store fine particles. The gas supply/suction member is configured to supply gas to the storage member and suck the gas from the storage member. The seat back is configured to support a back of the occupant. The gas supply/suction member fluidizes the fine particles stored in the storage member by supplying the gas to the storage member to make it easy to change a shape of the storage member. The gas supply/suction member solidifies the fine particles stored in the storage member by sucking the gas from the storage member to make it hard to change the shape of the storage member. The storage member includes a rigid inclined member disposed on at least one end of a periphery of the storage member and configured to be inclined downward from an outer periphery of the seat cushion toward a center of the seat cushion.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

The vehicle seats disclosed in JP-A No. H10-229930 and JP-UM-A No. H4-115448 would maintain the sitting posture of the occupant even though this sitting posture is not the recommended posture.

Therefore, when the occupant sits in an unrecommended posture, it is desired for the occupant to correct the sitting posture to the recommended posture in view of the safety.

It is desirable to provide a vehicle seat capable of improving the comfort of the occupant sitting on the seat while preventing the occupant from sitting in an unrecommended posture.

Embodiment

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

<Schematic Configuration of Vehicle Seat>

The schematic configuration of a vehicle seat 10 according to the embodiment of the disclosure will be described with reference to FIGS. 1 and 2.

Figure 1:
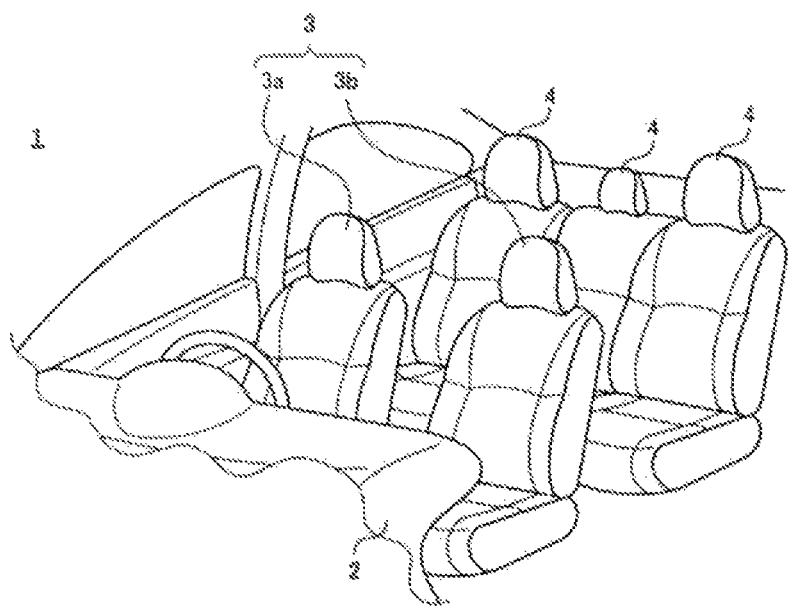
FIG. 1 is a perspective view illustrating the interior of a vehicle equipped with a vehicle seat according to an embodiment of the disclosure.

FIG. 1 is a perspective view illustrating the interior of a vehicle equipped with the vehicle seat 10. FIG. 2 is a perspective view illustrating the vehicle seat 10.

As illustrated in FIG. 1, a front seat 3 behind an instrument panel 2, and a rear seat 4 behind the front seat 3 are disposed in the interior of the vehicle 1. The front seat 3 includes a driver's front seat 3*a* and a front seat 3*b* next to the driver. With the embodiment, the vehicle seat 10 is applicable to at least one of the front seat 3 and the rear seat 4.

Figure 2:
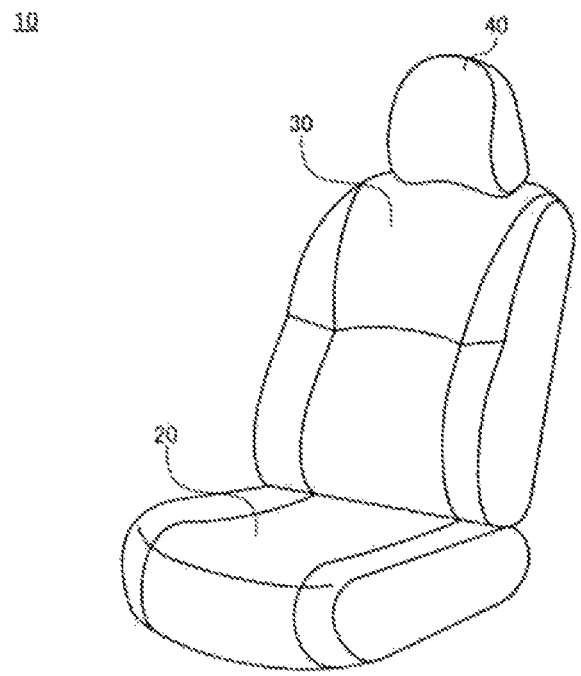
FIG. 2 is a perspective view illustrating the vehicle seat according to the embodiment of the disclosure.

As illustrated in FIG. 2, the vehicle seat 10 includes a seat cushion 20 fixed to the structure of the vehicle body, a seat back 30 configured to extend upward from the back end of the seat cushion 20, and a head rest 40 provided on the upper end of the seat back 30.

The seat cushion 20 is configured to support the hip and the legs of the occupant, and the seat back 30 is configured to support the back of the occupant. The head rest 40 is configured to support the head of the occupant.

<Configuration of Seat Cushion>

Figure 3:
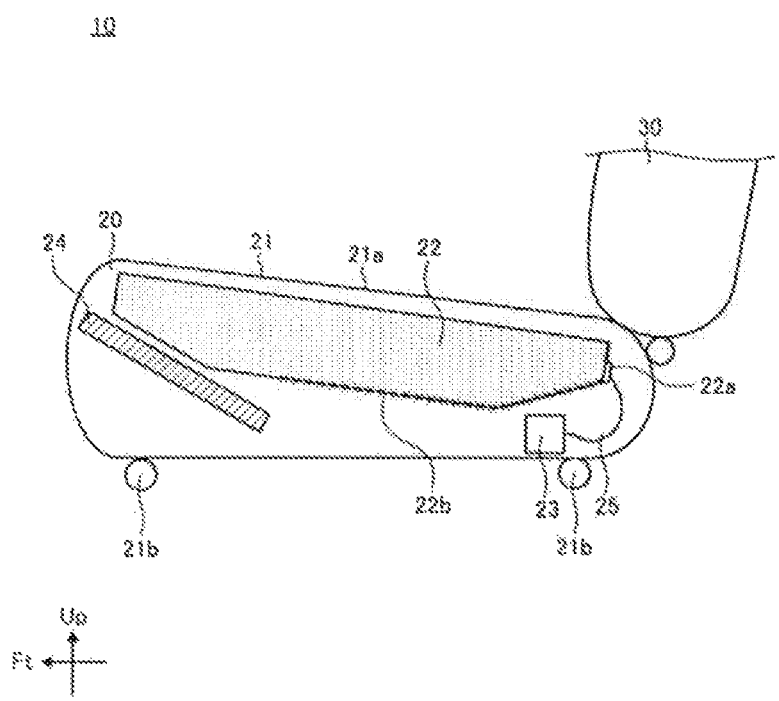
FIG. 3 is a longitudinal cross-sectional view schematically illustrating a seat cushion of the vehicle seat according to the embodiment of the disclosure, taken along the front-to-back direction of the vehicle.

Next, the configuration of the seat cushion 20 according to the embodiment of the disclosure will be described with reference to FIG. 3. FIG. 3 is a longitudinal cross-sectional view schematically illustrating the seat cushion 20 of the vehicle seat 10, taken along the front-to-back direction of the vehicle 1. Here, FIGS. 1 and 2 will also be referred again if necessary.

As illustrated in FIG. 3, the seat cushion 20 includes a seat surface 21 configured to contact the hip and the legs of the occupant, a storage member 22 shaped into a bag to store fine particles, and a gas supply/suction member 23 configured to supply gas to the storage member 22 and suck the gas from the storage member 22.

In addition, a seat pressure sensor 21*b* configured to detect the pressure applied to the seat cushion 20 is provided under the seat cushion 20 in a support (not shown) of the seat cushion 20.

The seat surface 21 is covered with a surface skin member 21*a* made of, for example, cloth, real leather, or synthetic leather.

The storage member 22 is provided below the seat surface 21 to face the hip of the occupant sitting on the vehicle seat 10. The storage member 22 is made of a flexible and gas-impermeable material and shaped into a bag.

In addition, the storage member 22 includes a coupling member 22*a* configured to flow the gas supplied to or sucked from the gas supply/suction member 23 in the storage member 22.

With the embodiment, the gas supplied to and sucked from the storage member 22 is the air (outside air), but this is by no means limiting. The gas may be atmosphere as a medium to facilitate the fluidization and the solidification of the fine particles.

The storage member 22 is shaped into a bag and made of a flexible and gas-impermeable material, and therefore is airtight to the outside. When the storage member 22 is filled with the gas via the gas supply/suction member 23, the storage member 22 is expanded to change in shape. The storage member 22 is expanded to change the shape, and therefore the fine particles stored in the storage member 22 can flow in the storage member 22.

When the gas is sucked from the storage member 22 via the gas supply/suction member 23, the storage member 22 is shrunk to change in shape. By this means, the fine particles tightly adhere to each other and then are solidified in the storage member 22.

A rectangular rigid inclined plate 24 (rigid inclined member) which is inclined from the outer periphery to the center of the seat cushion 20 is provided below the front part of the storage member 22. The rigid inclined plate 24 is made of, for example, steel, wood, or reinforced plastic, and configured to support the bottom surface of the front part of the storage member 22 such that the front part of the storage member 22 can swing.

Here, with the embodiment, the rigid inclined slope 24 is provided below the front part of the storage member 22, but this is by no means limiting. The rigid inclined slope 24 may be provided below the storage member 22 from the front part to the center of the storage member 22.

A fixing part 22*b* configured to fix the storage member 22 to the inside of the seat cushion 20 is provided on the bottom surface of the storage member 22 except the front part so as to restrict the bottom surface of the storage member 22 except the front part from moving.

The gas supply/suction member 23 may be, for example, a compressor, and is coupled to the coupling member 22*a* of the storage member 22 via a flow tube 25. The gas supply/suction member 23 supplies the gas to the storage member 22 or sucks the gas from the storage member 22 in response to a control signal from a controller 100 described later.

The gas supply/suction member 23 supplies the gas to the storage member 22 via the flow tube 25 to expand the storage member 22 to change the shape of the storage member 22, so that the fine particles stored in the storage member 22 are fluidized. The fluidization of the fine particles stored in the storage member 22 makes it easy to change the shape of the storage member 22.

Meanwhile, the gas supply/suction member 23 sucks the gas from the storage member 22 via the flow tube 25 to shrink the storage member 22 to change the shape of the storage member 22, so that the fine particles stored in the storage member 22 are solidified. The solidification of the fine particles stored in the storage member 22 makes it hard to change the shape of the storage member 22.

<Electrical Configuration of Vehicle Seat>

Figure 4:
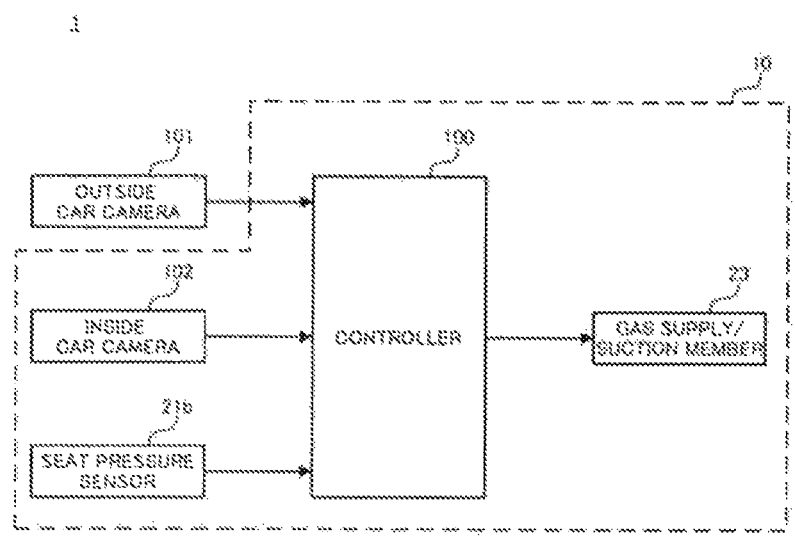
FIG. 4 is a block diagram illustrating the electrical configuration of the vehicle seat according to the embodiment of the disclosure.

Next, the electrical configuration of the vehicle seat 10 according to the embodiment of the disclosure will be described with reference to FIG. 4. FIG. 4 is a block diagram illustrating the electrical configuration of the vehicle seat 10.

As illustrated in FIG. 4, the vehicle seat 10 includes the controller 100. The controller 100 is communicably coupled to the seat pressure sensor 21*b*, the gas supply/suction member 23, an outside car camera 101 configured to capture images in the traveling direction of the vehicle 1, and an inside car camera configured to capture images of the occupants in the vehicle 1.

The inside car camera 102 functions as a posture detector configured to detect the posture of the occupant sitting on the vehicle seat 10. In addition, the seat pressure sensor 21*b* allows the posture of the sitting occupant to be estimated based on the pressure distribution.

The controller 100 includes a processor, a memory, a storage (not shown) and so forth, and is configured to control the whole of the components of the vehicle seat 10 and perform control processing to realize various functions of the vehicle seat 10. The processor invokes programs according to the embodiment and loads the programs into the memory, and then executes the programs in a predetermined sequence to perform the control of the seat cushion conforming to the sitting posture of the occupant.

To be more specific, the controller 100 detects the sitting posture of the occupant based on the pressure applied to the seat cushion 20 acquired from the seat pressure sensor 21b, or the image of the occupant acquired from the inside car camera 102. Then, the controller 100 causes the gas supply/suction member 23 to supply or suck the gas based on the detected sitting posture.

<Preventing Occupant from Sitting in Unrecommended Posture>

Figure 5:
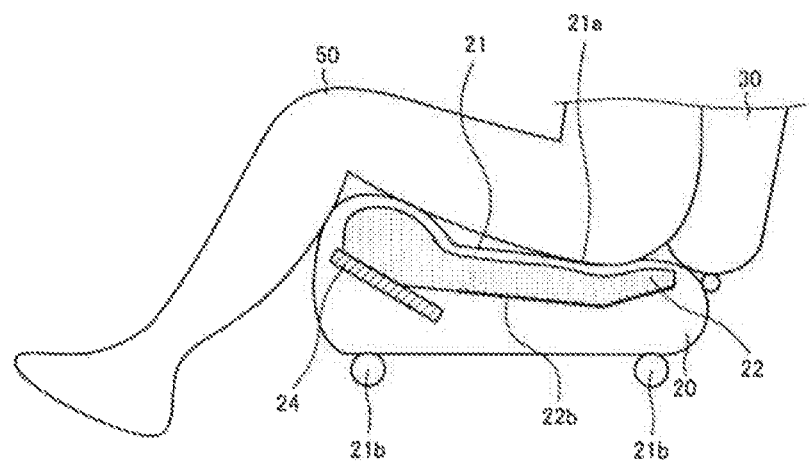
FIG. 5 is a longitudinal cross-sectional view schematically illustrating a state where an occupant sits on the vehicle seat according to the embodiment of the disclosure, taken along the front-to-back direction of the vehicle.

Next, a case where the vehicle seat 10 according to the embodiment of the disclosure prevents the occupant from sitting in an unrecommended posture will be described with reference to FIG. 5. FIG. 5 is a longitudinal cross-sectional view schematically illustrating the state where an occupant 50 sits on the vehicle seat 10, taken along the front-to-back direction of the vehicle 1. Here, FIG. 3 will also be referred again if necessary.

When determining that the occupant sits on the front part of the seat surface 21, that is, sits in an unrecommended posture in the case where the gas supply/suction member 23 sucks the gas from the storage member 22, and therefore it makes it hard to change the shape of the storage member 22, the controller 100 causes the gas supply/suction member 23 to supply the gas into the storage member 22 to make it easy to change the shape of the storage member 22. By this means, it makes it easy to change the sitting posture of the occupant 50.

By making it easy to change the shape of the storage member 22, the hip of the occupant 40 slides backward on the seat surface 21 by the rigid inclined plate 24.

As the hip of the occupant 40 slides backward on the seat surface 21, the fine particles flow toward the front end of the storage member 22. Then, the fine particles are eccentrically located in the front part of the storage member 22 to form a convex portion in the front part of the storage member 22 as illustrated in FIG. 5. By this means, the seat surface 21 of the front part of the seat cushion 20 is protruded by the convex portion of the storage member 22.

This protrusion can prevent the occupant 50 from sitting on the front part of the seat surface 21.

After that, the controller 100 causes the gas supply/suction member 23 to suck the gas from the storage member 22 to make it hard to change the shape of the storage member 22. By this means, it is possible to maintain the surface of the seat cushion 20 in the shape conforming to the sitting posture of the occupant 50, and consequently to improve the comfort of the occupant 50 sitting on the seat, while preventing the occupant 50 from sitting on the front part of the seat surface 21 which is an unrecommended posture.

In addition, by protruding the seat surface 21 of the front part of the seat cushion 20, it is possible to receive the inertia force due to the gravitational acceleration applied in the front-to-back direction when the vehicle 1 is moving.

Moreover, by protruding the seat surface 21 of the front part of the seat cushion 20, it is possible to prevent the occupant 50 from sliding forward and submarining in a front collision of the vehicle 1.

Furthermore, even when the fine particles are eccentrically located in the front part of the storage member 22 as illustrated in FIG. 5, the controller 100 causes the gas supply/suction member 23 to supply the gas into the storage member 22 to make it easy to change the shape of the storage member 22, so that the fine particles flow downward under its own weight along the rigid inclined plate 24. By this means, when the occupant 50 stands up from the seat cushion 20 and leaves the seat cushion 20, it makes it easy to change the shape of the storage member 22 to evenly distribute the fine particles stored in the storage member 22 as the initial state, and therefore it is possible to improve the form stability of the storage member 22.

Meanwhile, when the occupant 50 starts to sit down on the seat cushion 20, the controller 100 causes the gas supply-suction member 23 to supply the gas into the storage member 22 to make it easy to change the shape of the storage member 22. By this means, it is possible to prevent the original sitting posture of occupant 50 from being an unrecommended posture, that is, prevent the occupant 50 from sitting on the front part of the seat surface 21.

<Modification>

Figure 6A:
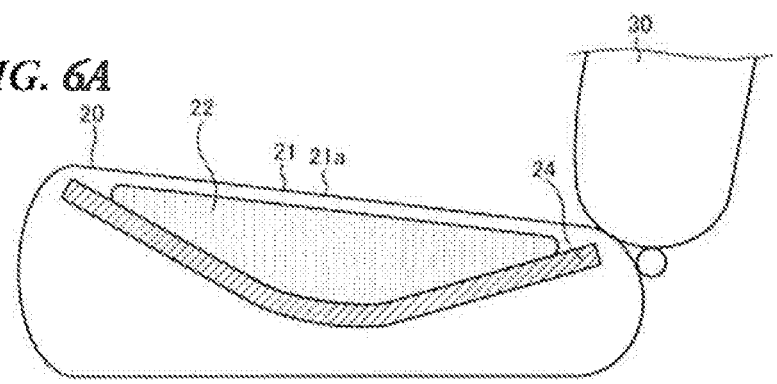
FIGS. 6A-6B are schematic cross-sectional views illustrating the vehicle seat according to a modification of the disclosure.
Figure 6B:
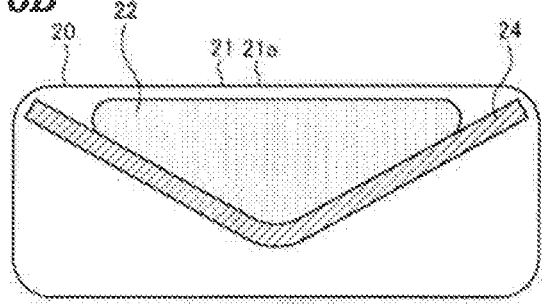

With the above-described embodiment, the rectangular rigid inclined plate 24 is provided under the front part of the storage member 22, but this is by no means limiting. An approximately frusto-conical rigid inclined plate is applicable. FIG. 6A is a longitudinal cross-sectional view schematically illustrating the vehicle seat 10 taken along the front-to-back direction of the vehicle 1. FIG. 6B is a traverse cross-sectional view schematically illustrating the vehicle seat 10 taken along the width direction of the vehicle 1.

With the modification, the rigid inclined plate 24 may be an approximately frusto-conical surrounding wall. The storage member 22 is disposed on the inner surface of the approximately frusto-conical surrounding wall.

With the modification, as illustrated in FIGS. 3 and 5, it is possible to maintain the surface of the seat cushion 20 in the shape conforming to the original sitting posture of the occupant 50, and consequently to improve the comfort of the occupant 50 sitting on the seat, while preventing the occupant 50 from sitting on the front part of the seat surface 21 which is an unrecommended posture. In addition, it is possible to receive the inertia force due to the gravitational acceleration applied in the front-to-back direction and prevent the submarining, and to improve the form stability of the storage member 22.

Moreover, as illustrated in FIG. 6B, the approximately frusto-conical rigid inclined plate 24 is inclined downward toward the center of the seat cushion 20 from both the right and left sides.

When determining that the occupant 50 sits on one end of the seat surface 2 in either the right or left side which is an unrecommended posture in the case where the gas supply/suction member 23 sucks the gas from the storage member 22, that is, the shape of the storage member 22 is hard to change, the controller 100 causes the gas supply/suction member 23 to supply the gas into the storage member 22 to make it easy to change the shape of the storage member 22. By this means, it makes it easy to change the sitting posture of the occupant 50.

By making it easy to change the shape of the storage member 22, the hip of the occupant 50 slides down toward the center of the seat surface 21 along the rigid inclined plate 24, and therefore it is possible to correct the sitting posture of the occupant 50 to sit the occupant 50 on the center of the seat surface 21 which is the recommended posture.

Meanwhile, when the original sitting posture of the occupant 50 is the recommended posture, that is, the occupant 50 sits on the center of the seat surface 21, the fine particles flow and are eccentrically-located on both the right and left sides of the storage member 22, and therefore convex portions are formed in both the right and left sides of the storage member 22 and protrude the seat surface 21. Therefore, it is possible to receive the inertia force due to the gravitational acceleration applied in the right-to-left direction when the vehicle 1 is moving.

As described above, with the modification, it is possible to maintain the surface of the seat cushion 20 in the shape conforming to the sitting posture of the occupant 50, and consequently to improve the comfort of the occupant 50 sitting on the seat, while preventing the occupant 50 from sitting in an unrecommended posture. Moreover, by making it easy to change the shape of the storage member 22, it is possible to evenly distribute the fine particles stored in the storage member 22 as the initial state, and consequently to improve the form stability of the storage member 22.

As described above, according to the embodiment, the storage member 22 made of a flexible and gas-impermeable material and shaped into a bag is provided in the seat cushion 20 of the vehicle seat 10 to store fine particles. The storage member 22 includes the rigid inclined plate 24 which is inclined downward from the outer periphery of the seat cushion 20 toward the center of the seat cushion 20 in at least one end of the periphery. In addition, it is possible to switch the state of the storage member 22 between the state where it makes it easy to change the shape of the storage member 22 and the state where it makes it hard to change the shape of the storage member 22 by using the gas supply/suction member 23. When it makes it easy to change the shape of the storage member 22, the sitting posture of the occupant 50 can be changed. By this means, it is possible to maintain the surface of the seat cushion 20 in the shape conforming to the original sitting posture of the occupant 50, and consequently to improve the comfort of the occupant 50 sitting on the seat, while preventing the occupant 50 from sitting in an unrecommended posture.

Moreover, with the embodiment described above, the fine particles stored in the storage member 22 can flow downward under its own weight along the rigid inclined plate 24, and therefore it is possible to improve the form stability of the storage member 22.

The invention claimed is:

1. A vehicle seat comprising:
   a seat cushion configured to support a hip of an occupant, the seat cushion including
     a storage member made of a flexible and gas-impermeable material, shaped into a bag, and configured to store fine particles, and
     a gas supply/suction member configured to supply gas to the storage member and suck the gas from the storage member; and
   a seat back configured to support a back of the occupant, wherein
   the gas supply/suction member fluidizes the fine particles stored in the storage member by supplying the gas to the storage member to make it easy to change a shape of the storage member,
   the gas supply/suction member solidifies the fine particles stored in the storage member by sucking the gas from the storage member to make it hard to change the shape of the storage member, and
   the storage member includes a rigid inclined member disposed on at least one end of a periphery of the storage member and configured to be inclined downward from an outer periphery of the seat cushion toward a center of the seat cushion.

2. The vehicle seat according to claim 1, wherein the rigid inclined member is inclined downward from a front part of the seat cushion toward the center of the seat cushion.

3. The vehicle seat according to claim 1, wherein the rigid inclined member is inclined downward from one of right and left sides of the seat cushion toward the center of the seat cushion.

4. The vehicle seat according to claim 2, wherein the rigid inclined member is inclined downward from one of right and left sides of the seat cushion toward the center of the seat cushion.

5. The vehicle seat according to claim 1, wherein:
   the rigid inclined member includes an approximately frusto-conical surrounding wall configured to be inclined from the outer periphery of the seat cushion toward the center of the seat cushion; and
   the storage member is disposed on an inner surface of the approximately frusto-conical surrounding wall.

6. The vehicle seat according to claim 2, wherein:
   the rigid inclined member includes an approximately frusto-conical surrounding wall configured to be inclined from the outer periphery of the seat cushion toward the center of the seat cushion; and
   the storage member is disposed on an inner surface of the approximately frusto-conical surrounding wall.

7. The vehicle seat according to claim 3, wherein:
   the rigid inclined member includes an approximately frusto-conical surrounding wall configured to be inclined from the outer periphery of the seat cushion toward the center of the seat cushion; and
   the storage member is disposed on an inner surface of the approximately frusto-conical surrounding wall.

8. The vehicle seat according to claim 4, wherein:
   the rigid inclined member includes an approximately frusto-conical surrounding wall configured to be inclined from the outer periphery of the seat cushion toward the center of the seat cushion; and
   the storage member is disposed on an inner surface of the approximately frusto-conical surrounding wall.

* * * * *